(12) United States Patent
Arnault et al.

(10) Patent No.: US 11,682,949 B2
(45) Date of Patent: Jun. 20, 2023

(54) EARTHING BRUSH ASSEMBLY

(71) Applicant: Aktiebolaget SKF, Gothenburg (SE)

(72) Inventors: Benoit Arnault, Saint-Cyr-sur-Loire (FR); Paul Feliciano, Saint Cyr-sur-Loire (FR); Thomas Perrotin, Saint Roch (FR)

(73) Assignee: Aktiebolaget SKF, Gothenburg (SE)

( * ) Notice: Subject to any disclaimer, the term of this patent is extended or adjusted under 35 U.S.C. 154(b) by 0 days.

(21) Appl. No.: 17/589,911

(22) Filed: Feb. 1, 2022

(65) Prior Publication Data

US 2022/0294319 A1    Sep. 15, 2022

(30) Foreign Application Priority Data

Mar. 11, 2021    (FR) ...................................... 2102408

(51) Int. Cl.
*H02K 11/40*    (2016.01)
*H02K 5/14*    (2006.01)
*H02K 13/00*    (2006.01)

(52) U.S. Cl.
CPC .............. *H02K 11/40* (2016.01); *H02K 5/14* (2013.01); *H02K 5/146* (2013.01); *H02K 13/00* (2013.01)

(58) Field of Classification Search
CPC .......... H02K 5/14; H02K 5/146; H02K 11/40; H02K 13/00
USPC ................................. 310/71, 234, 235, 239
See application file for complete search history.

(56) References Cited

U.S. PATENT DOCUMENTS

| | | | |
|---|---|---|---|
| 4,656,409 A * | 4/1987 | Shimizu | B62D 5/0403 180/444 |
| 4,686,397 A * | 8/1987 | Becker | H02K 41/035 310/233 |
| 2019/0296617 A1 | 9/2019 | Hubert | |
| 2021/0021180 A1 | 1/2021 | Hubert | |
| 2021/0364040 A1* | 11/2021 | Arnault | F16C 35/077 |
| 2022/0329127 A1* | 10/2022 | Hubert | F16C 19/06 |

FOREIGN PATENT DOCUMENTS

JP    2015207533 A    11/2015

OTHER PUBLICATIONS

Manabu et al., English Machine Translation of JP 2015/207533 (Year: 2015).*

* cited by examiner

*Primary Examiner* — Rashad H Johnson
(74) *Attorney, Agent, or Firm* — Garcia-Zamor Intellectual Property Law, LLC; Ruy Garcia-Zamor (57) ABSTRACT

An earthing brush assembly including an earthing brush and a brush mounting plate configured to radially and axially retain the brush, the brush having a support and a plurality of conductive individual fibres mounted in the support, the mounting plate providing a radial main body axially delimited by a first front face and by a second front face, and a plurality of tongues for axially and radially retaining the brush, the tongues being circumferentially distributed around the main body of the mounting plate and extending axially from the second front face of the main body. The brush mounting plate includes at least three mounting segments extending radially outwards from an outer surface of the main body, the mounting segments being distributed circumferentially around the main body of the mounting plate, each one of the segments locally surrounding the

(Continued)

support of the earthing brush while remaining radially separated from the support.

9 Claims, 7 Drawing Sheets

EARTHING BRUSH ASSEMBLY

CROSS-REFERENCE TO RELATED APPLICATIONS

This application claims priority to French Patent Application no. 2102408, filed Mar. 11, 2021, the contents of which is fully incorporated herein by reference

TECHNICAL FIELD OF THE INVENTION

The present invention relates to the field of earthing devices for controlling the shaft current generated in electric motors or machines, and in particular earthing brush assemblies.

PRIOR ART

In general, in an electric motor or machine, a rolling bearing is mounted between a housing of the motor in order to support a rotary shaft. It is desirable to electrically earth the rotary shaft.

Indeed, as the shaft rotates, an electrical potential difference can appear between the shaft and the housing of the electric motor, which produces an electrical potential between an inner race of the rolling bearing, which is secured to the shaft, and an outer race of the rolling bearing, which is directly or indirectly secured to the housing of the electric motor.

The current passing through the elements of the rolling bearing can damage the elements, in particular the raceways and the rolling elements. Electric discharges can also generate vibrations and increase the noise burden of the motor.

With the aim of addressing these drawbacks, it is known to earth or ground the rotary shaft by using an earthing brush comprising conductive fibers. The earthing brush is generally mounted on a housing of the electric motor in such a way that the distal ends of the fibers are in radial contact with the surface of the rotary shaft. By virtue of the conductivity of the fibers, the brush is kept at the same electrical potential as the housing of the electric motor. The inner and outer races of the rolling bearing are also at the same electrical potential, which reduces or even eliminates problematic electrical discharges through the rolling bearing.

However, it is necessary to produce earthing brushes for each shape and size of the rotary shaft and the housing of the electric motor.

Document US20210021180A1 discloses earthing brush assemblies comprising an earthing brush comprising a plurality of conductive fibers and a mounting plate comprising an annular flange that radially surrounds the earthing brush and a plurality of tongues for radially and axially retaining the earthing brush.

However, an earthing brush assembly of this kind is not suitable for electric motors having a small radial space between the housing and the rotary shaft.

There is a need to propose an earthing brush assembly that can be adapted to the variation in diameters of shafts and housings used in electric motors, while being suitable for electric motors having a small radial space between the housing and the rotary shaft.

SUMMARY OF THE INVENTION

The present invention aims to address these drawbacks and to propose an improved earthing brush assembly.

The present invention relates to an earthing brush assembly comprising an earthing brush and a brush mounting plate configured to radially and axially retain the brush. The brush comprises a support and a plurality of conductive individual fibers mounted in the support.

The mounting plate comprises a radial main body that is axially delimited by a first front face and by a second front face, and a plurality of tongues for axially and radially retaining the brush, the tongues being circumferentially distributed around the main body of the mounting plate and extending axially from the second front face of the main body.

The brush mounting plate comprises at least three mounting segments extending radially outwards from an outer surface of the main body, the mounting segments being distributed circumferentially around the main body of the mounting plate, each one of the segments locally surrounding the support of the earthing brush while remaining radially separated from the support.

The holding tongues serve for axially and radially retaining the earthing brush.

The particular outer shape of the mounting plate makes it possible to easily adapt to different diameters of the shaft of the electric motor.

The radial main body is for example radially delimited by a bore and an outer surface.

For example, the main body is annular.

For example, the mounting segments extend axially from the second front face of the main body.

Advantageously, the support of the earthing brush bears axially against the second front face of the main body of the mounting plate.

Thus, the holding tongues serve to axially immobilize the support of the earthing brush against the second front face of the main body of the mounting plate.

Advantageously, the mounting segments are regularly distributed about the circumference of the main body and are circumferentially spaced apart from one another. For example, the three segments are arranged at 120° from one another.

As a variant, it is possible to provide that the mounting segments are not regularly distributed about the circumference of the main body.

The mounting segments are not regularly distributed about the circumference of the mounting plate. Indeed, one mounting segment is angularly offset with respect to the other mounting segments.

For example, the number of holding tongues is identical to the number of mounting segments, each tongue being arranged between two adjacent segments.

For example, the number of axial holding tongues is equal to eight. As a variant, is possible to provide a different number of axial holding tongues, for example greater than or equal to three.

For example, the number of holding tongues is different to the number of mounting segments.

For example, it is possible to provide a number of mounting segments equal to eight and a number of axial holding tongues equal to four.

For example, it is possible to provide a number of mounting segments greater than eight.

Advantageously, each holding tongue comprises an axial portion extending axially from the outer surface of the main body, axially towards the earthing brush, and a retaining lip or hook extending radially inwards from an end of the axial portion, on the opposite side from the main body.

The retaining lip is designed to axially retain the earthing brush.

According to one embodiment, each mounting segment comprises an outer axial bearing surface extending axially from the second front face of the main body, for example beyond the earthing brush. The outer axial bearing surface is radially spaced apart, by a non-zero radial distance, from the support of the earthing brush.

According to one embodiment, each mounting segment comprises two connecting portions that connect the outer bearing surface to the outer surface of the main body, such that the mounting plate has an undulated continuous outer surface. Such an outer shape of the mounting plate improves resistance to clamping and reduces the deformation of the plate.

Advantageously, the earthing brush takes the form of an open or closed ring.

For example, in the case of an open ring, the earthing brush comprises a first end that is circumferentially spaced apart from a second end.

The holding plate can be created by stamping from a conductive material.

According to a second aspect, the present invention relates to an electric machine or motor comprising a housing, a shaft and at least one earthing brush assembly according to any one of the preceding embodiments, mounted radially between the housing and the shaft, in particular the outer cylindrical surface thereof, and in radial contact with the shaft, in particular by the distal end of the conductive fibers of the brush.

BRIEF DESCRIPTION OF THE FIGURES

The present invention will be better understood upon studying the detailed description of the embodiments which are given by way of entirely non-limiting example and are illustrated by the appended drawings, in which.

DETAILED DESCRIPTION OF THE INVENTION

In the following description, the terms "outer" and "inner" refer to the axis of rotation X-X of the rotary shaft, the inner parts being closer to the axis of rotation than the outer parts.

Figure 1:
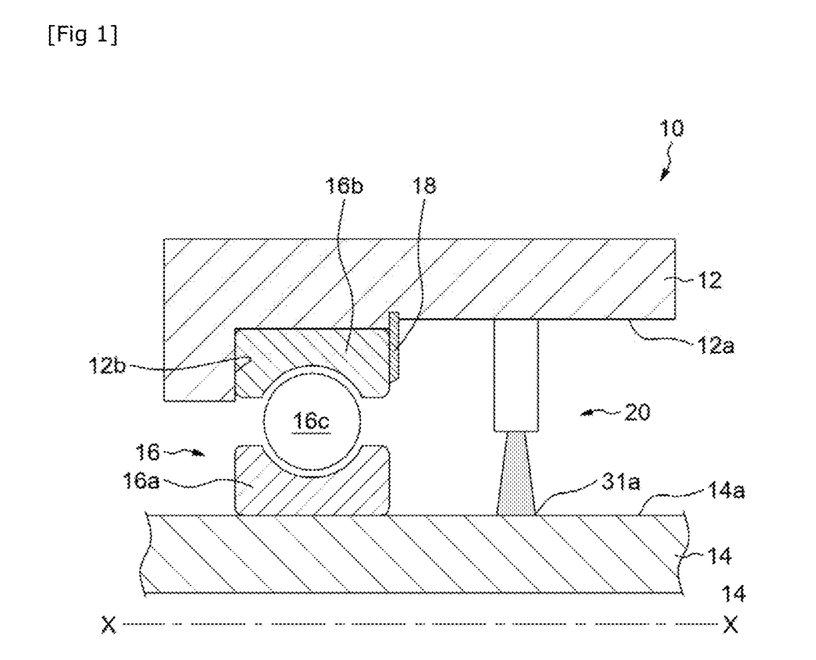
FIG. 1 is a view in axial section of an earthing brush assembly according to one embodiment of the invention, mounted radially between a rotary shaft and a housing of an electric motor.

FIG. 1 shows, in axial section, part of an electric motor 10 or machine comprising a fixed housing 12, a rotary shaft 14, of axis X-X, which is supported radially by a rolling bearing 16.

The motor 10 further comprises an earthing brush assembly 20 that is mounted radially between the bore 12a of the housing 12 and the outer cylindrical surface 14a of the rotary shaft 14.

The earthing brush assembly 20 serves to continuously dissipate the electrical charge accumulating on the shaft 14 of the motor when the motor is in operation, by transferring this charge to the housing 12.

As a variant, it is possible to provide that the earthing brush assembly 20 serve to continuously dissipate the electrical charge accumulating in the housing 12, by transferring this charge to the shaft 14.

The rolling bearing 16 comprises an inner race 16a, which is secured to the cylindrical outer surface 14a of the shaft 14, an outer race 16b mounted in the bore 12a of the housing 12 and a plurality of rolling elements 16c arranged radially between the races 16a, 16b. The outer race 16b of the rolling bearing 16 is held axially between a shoulder 12b of the housing 12 and an axial holding means 18 such as a circlip.

In this instance, the rolling elements 16c are balls. As a variant, other types of rolling elements could be provided, such as cylindrical or conical rollers, needles, etc.

It is also possible to provide a rolling bearing of the journal bearing type.

In the example shown, the outer race of the rolling bearing and the housing are two distinct elements. As a variant, it is possible to provide that the outer race of the rolling bearing is part of the housing of the motor.

The earthing brush assembly 20 has a generally annular shape, arranged radially around the shaft 14.

As illustrated in detail in FIGS. 2 to 5, the earthing brush assembly 20 comprises a brush 30 and a brush mounting plate 40 that is configured to axially and radially retain the brush 30.

The brush 30 comprises a plurality of conductive individual fibers 31 that are arranged circumferentially around the shaft 14.

The conductive fibers 31 may be made of carbon, stainless steel, conductive plastics, such as fibers made of acrylic or nylon.

The brush 30 further comprises a substantially annular holding or support member 32, in which the conductive fibers 31 are mounted.

Figure 4:
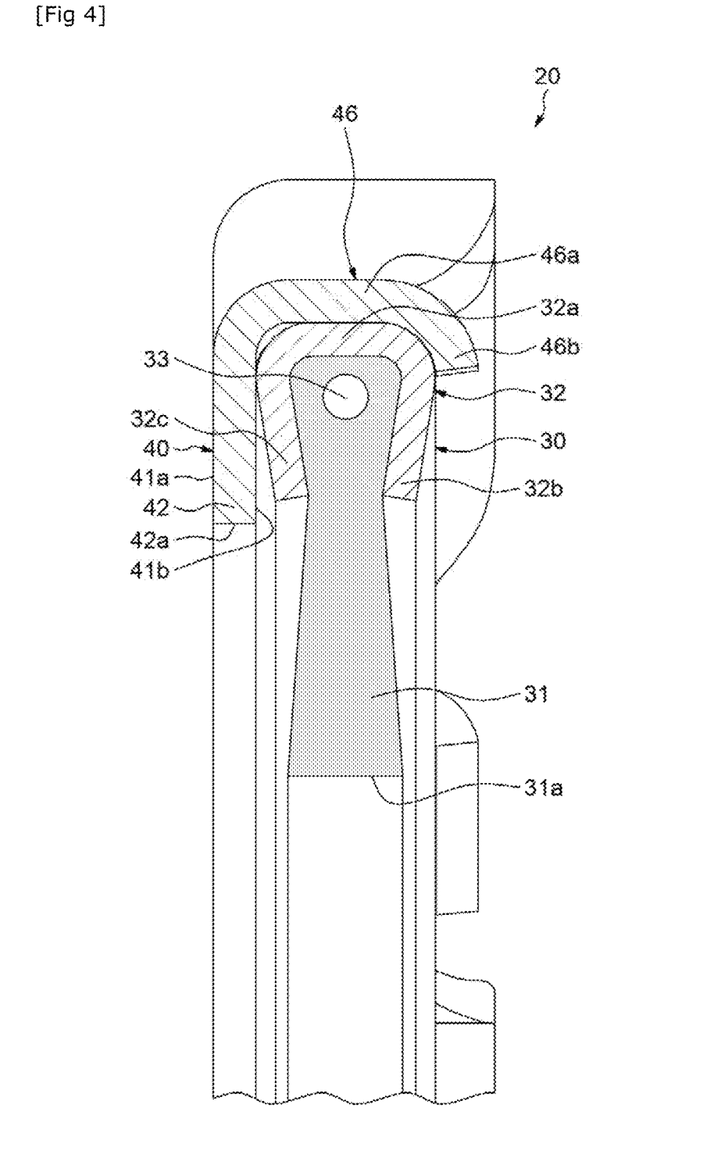
FIG. 4 is a view in section, along the line IV-IV, of the earthing brush assembly of FIG. 3.
Figure 5:
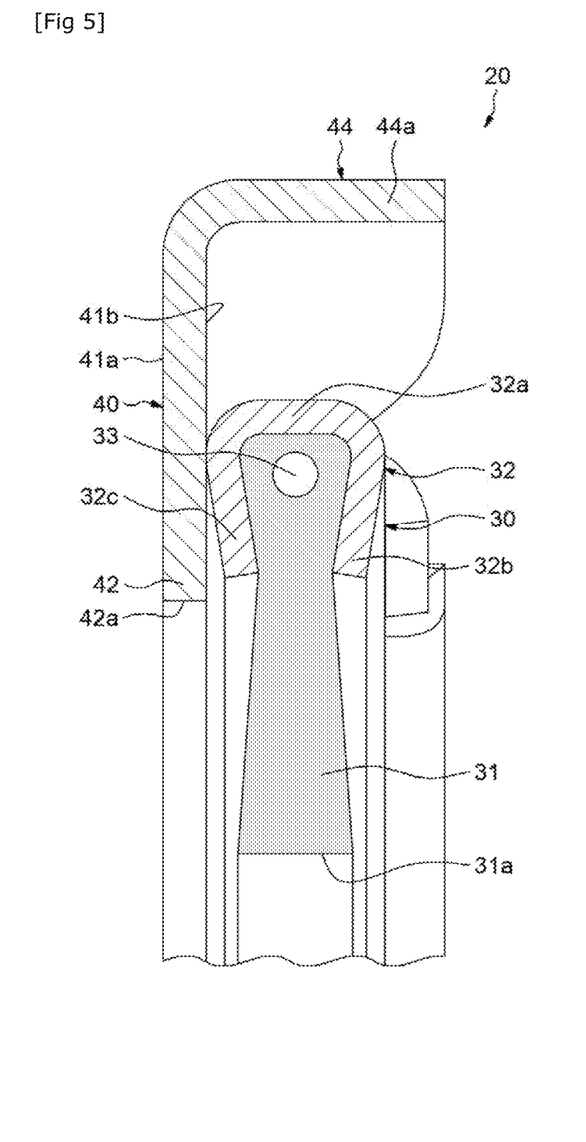
FIG. 5 is a view in section, along the line V-V, of the earthing brush assembly of FIG. 3.

The holding member 32 comprises an axial portion 32a and two lateral portions 32b, 32c extending radially inwards in order to grip the conductive fibers 31. The axial portion 32a and the two lateral portions 32b, 32c delimit a channel of U-shaped cross section, in which one end of the conductive fibers 31 is positioned.

In the example shown, and in entirely non-limiting fashion, the lateral portions 32b, 32c extend in a substantially inclined direction.

As depicted in FIGS. 4 and 5, the conductive fibers 31 are bent around a connecting wire 33.

The free distal end 31a of the conductive fibers 31 is in radial contact with the outer surface 14a of the shaft 14.

Figure 2:
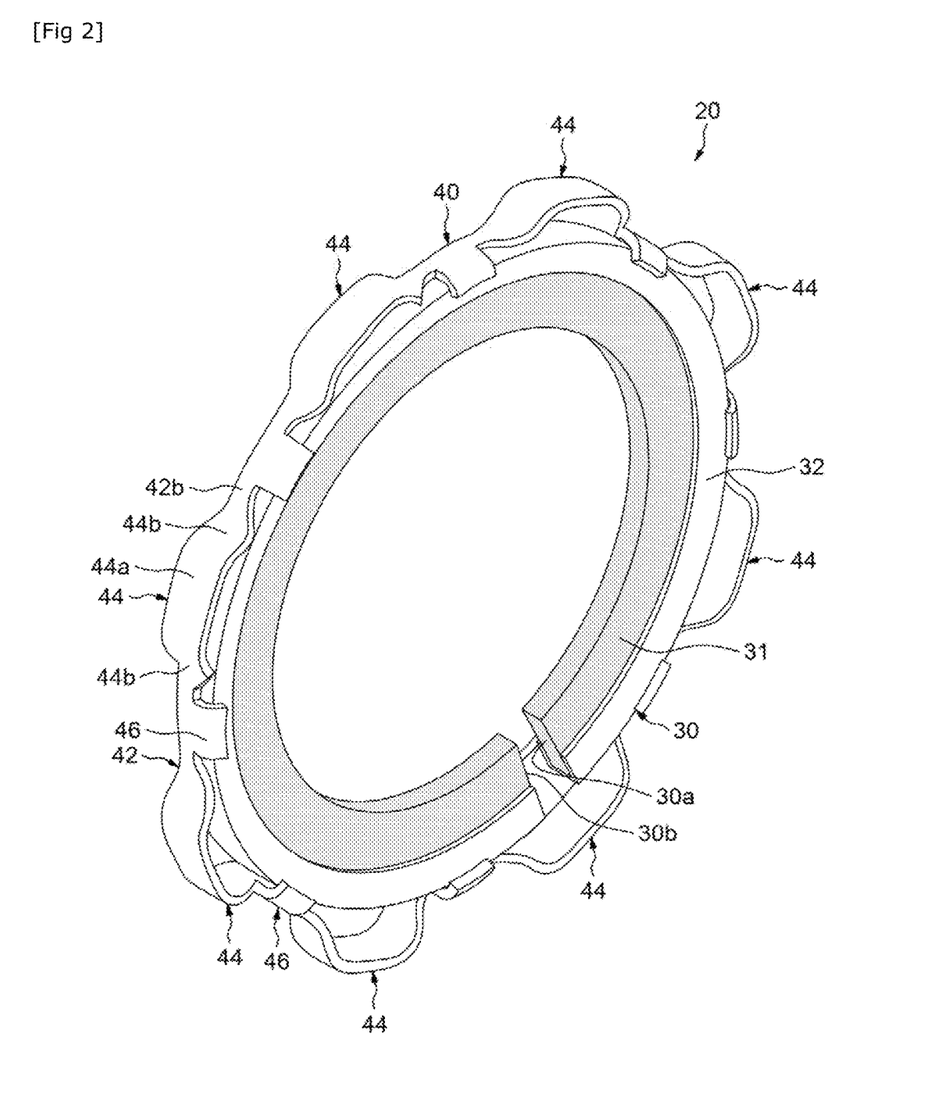
FIG. 2 is a perspective view of the earthing brush assembly of FIG. 1.
Figure 3:
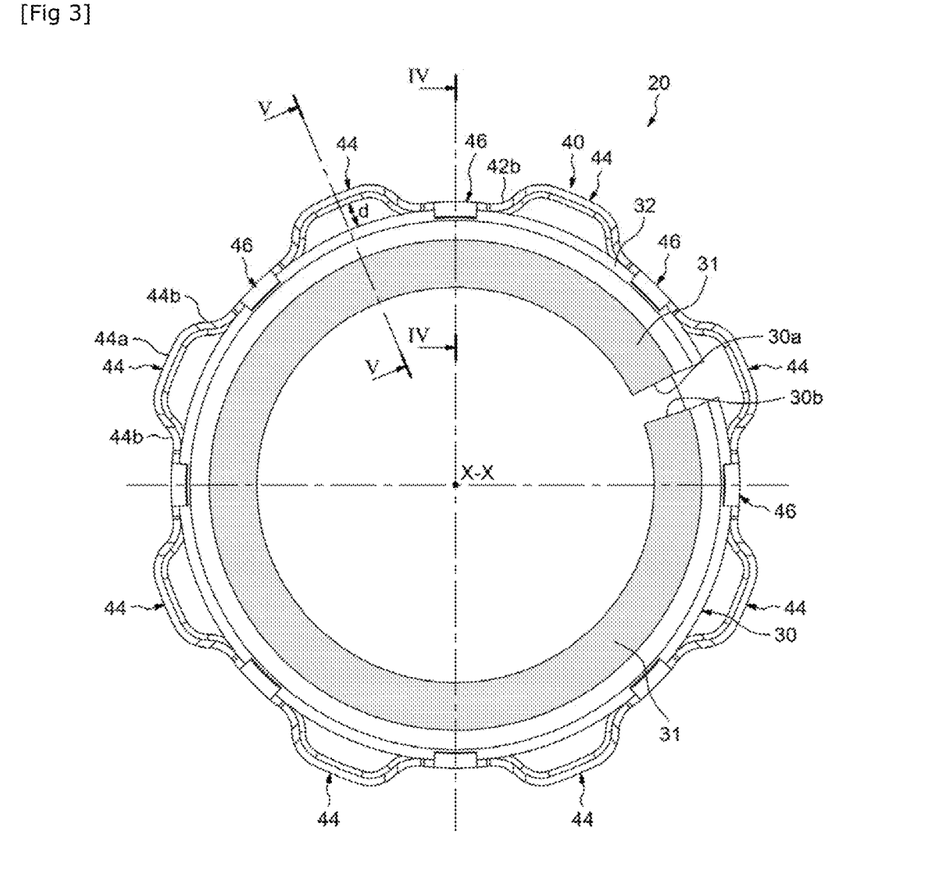
FIG. 3 is a front view of the earthing brush assembly of FIG. 2.

The earthing brush 30 is in the form of an open ring having a first end 30a that is circumferentially spaced apart from a second end 30b, as shown in FIGS. 2 and 3.

Such a circumferential spacing between two ends of the brush 30 allows the brush to adapt to various diameters of the shaft 14.

Indeed, the diameter of the brush 30 can be changed by applying a radial and/or circumferential force to the brush.

Generally, the first end 30a of the brush 30 and the second end 30b are not attached to one another, but may be in contact with one another.

As a variant, the first end 30a of the brush 30 and the second end 30b may be attached to one another.

The mounting plate 40 of the brush 30 comprises an annular radial main body 42 delimited axially by a first front face 41a and a second front face 41b, and radially by a bore 42a and an outer surface 42b The mounting plate 40 further comprises a plurality of mounting segments 44 extending from the outer surface 42b of the main body, radially outwards and axially from the second front face 41b, as in the example shown. As a variant, the segments may extend axially from the first front face 41a. Generally, the segments 44 extend axially in the same direction as the tongues 46.

Each mounting segment 44 comprises an outer bearing surface 44a that locally radially surrounds the support 32 of the earthing brush.

As illustrated, the outer bearing surface 44a extends axially beyond the earthing brush 30. As a variant, it is possible to provide that the outer bearing surface 44a does not extend axially beyond the earthing brush 30.

As shown, each mounting segment 44 comprises two connecting portions 44b that connect each outer bearing surface 44a to the outer surface 42b of the main body 42.

In the example shown, the outer bearing surface 44a of each mounting segment 44 is connected to the outer surface 42b of the main body 42 by two connecting portions 44b such that the mounting plate 40 has an undulated continuous outer surface. As a result, resistance to clamping is improved in comparison to an openworked shape.

As a variant, it is possible to provide that the mounting plate has no connecting portions 44b.

The outer bearing surface 44a of each mounting segment 44 is radially spaced apart from the axial portion 32a of the holding member 32 of the brush by a non-zero radial distance d.

In this instance, each mounting segment 44 is generally parallelepipedal in shape. As a variant, it is possible to provide another shape, for example a circular shape.

As shown in FIGS. 2 and 3, the mounting segments 44 are regularly distributed about the circumference of the main body 42 and are circumferentially spaced apart from one another.

As a variant, it is possible to provide that the mounting segments 44 are not regularly distributed about the circumference of the main body 42.

As shown, the number of mounting segments 44 is equal to eight. As a variant, is possible to provide a different number of mounting segments 44, for example greater than or equal to three.

The mounting plate 40 further comprises a plurality of holding tongues or tabs 46 extending axially from the second front face 41b of the main body 42.

The holding tabs 46 serve for axially and radially retaining the earthing brush 30.

Each holding tab 46 comprises an axial portion 46a extending axially from the second front face of the outer surface 42b of the main body and a retaining lip or hook 46b extending radially inwards from an end of the axial portion 46a, on the opposite side from the main body 42. The retaining lip 46b is designed to axially retain the earthing brush 30. The retaining lip 46b is in axial contact with one of the lateral portions 32b of the support 32.

The support 32 of the earthing brush 30 is held axially bearing against the second front face 41b of the main body 42 of the mounting plate.

The axial portion 46a of each holding tab 46 locally radially surrounds the support 32 of the brush 30 and is in radial contact with the axial portion 32a of the support 32.

As shown in FIGS. 2 and 3, the axial holding tabs 46 are regularly distributed about the circumference of the main body 42 and are circumferentially spaced apart from one another.

As a variant, it is possible to provide that the axial holding tabs 46 are not regularly distributed about the circumference of the main body 42.

As shown, an axial holding tab 46 is located between two adjacent mounting segments 44.

As shown, the number of axial holding tabs 46 is equal to eight. As a variant, is possible to provide a different number of axial holding tabs 46, for example greater than or equal to three.

As shown, the number of axial holding tabs 46 is identical to the number of mounting segments 44. As a variant, is possible to provide a number of axial holding tabs 46 that is different to the number of mounting segments 44.

In the example shown, the mounting plate 40 has an undulated continuous outer surface.

The mounting plate 40 is produced by stamping.

The mounting plate 40 is made out of a conductive material such as aluminium, stainless steel, bronze, copper or another material.

Figure 6:
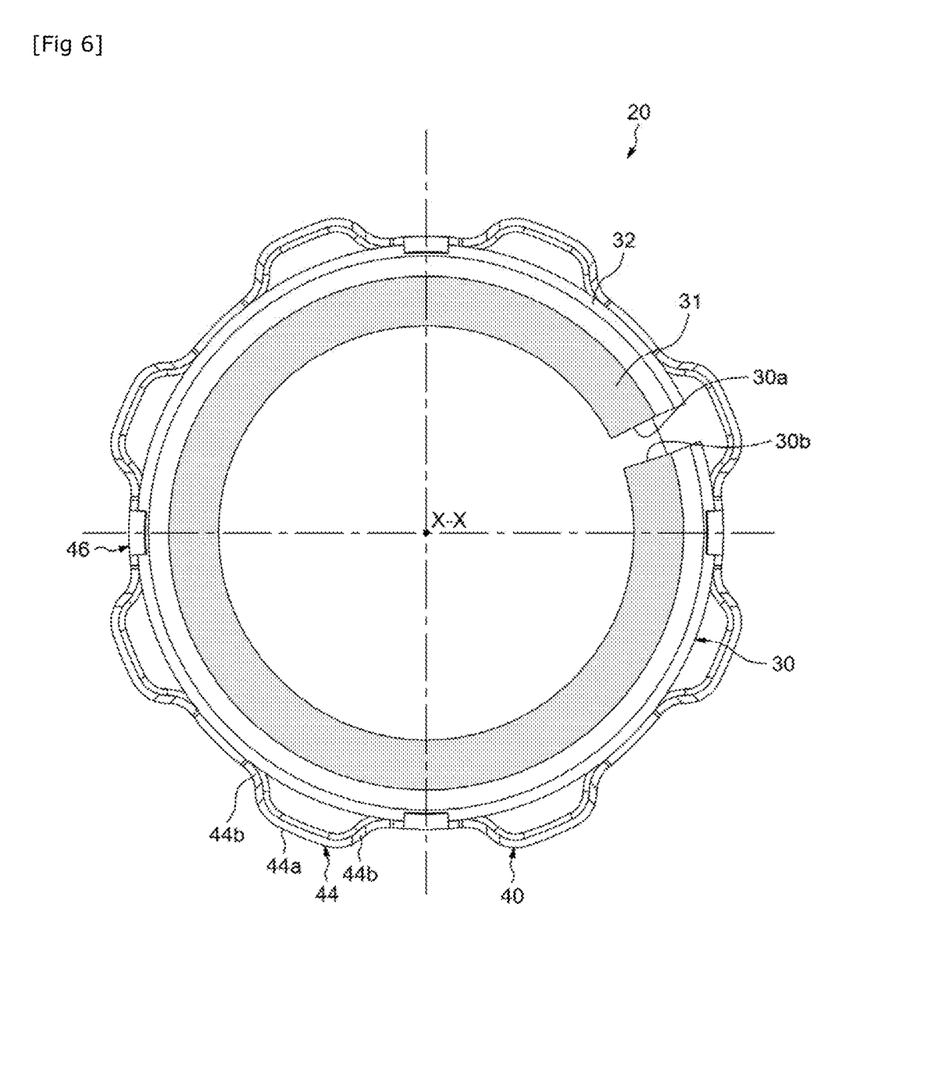
FIG. 6 is a front view of an earthing brush assembly according to a second embodiment of the invention.

The embodiment shown in FIG. 6, in which the same elements bear the same references, differs from the preceding embodiment in that the number of axial holding tabs 46 is different to the number of mounting segments 44.

As shown in FIG. 6, the number of mounting segments 44 is equal to eight and the number of axial holding tabs 46 is equal to four.

The axial holding tabs 46 are regularly distributed about the circumference of the mounting plate 40.

Figure 7:
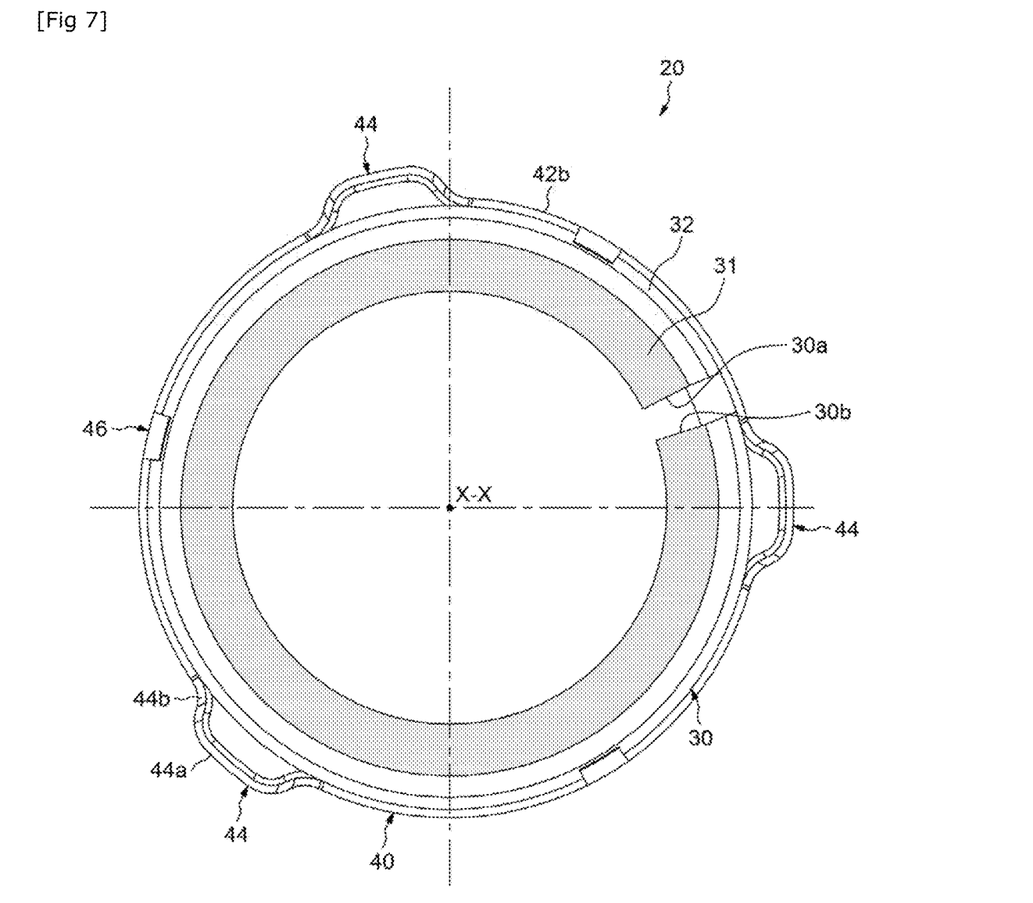
FIG. 7 is a front view of an earthing brush assembly according to a third embodiment of the invention.

The embodiment shown in FIG. 7, in which the same elements bear the same references, differs from the embodiment illustrated in FIGS. 2 to 5 in that the number of mounting segments 44 is equal to three.

As illustrated in FIG. 7, one mounting segment 44 is angularly offset with respect to the other mounting segments.

As a variant, it is possible to provide that the mounting segments are arranged at 120° from one another.

As illustrated in FIG. 7, the number of axial holding tabs 46 is equal to three, each tab being arranged between two adjacent mounting segments 44.

An earthing brush assembly of this kind is easy to produce by stamping, can be adapted to the variation in diameters of shafts and housings used in electric motors, while being suitable for electric motors having a small radial space between the housing and the rotary shaft.

The invention claimed is:

1. An earthing brush assembly comprising:
   an earthing brush, and
   a brush mounting plate configured to radially and axially retain the brush, the brush comprising a support and a plurality of conductive individual fibers mounted in the support, the mounting plate comprising a radial main body that is axially delimited by a first front face and by a second front face, and a plurality of tongues for axially and radially retaining the brush, the tongues being circumferentially distributed around the main body of the mounting plate and extending axially from the second front face of the main body, and at least three mounting segments extending radially outwards from an outer surface of the main body, the mounting segments being distributed circumferentially around the main body of the mounting plate, each one of the segments locally surrounding the support of the earthing brush while remaining radially separated from the support, wherein the mounting segments are regularly distributed about the main body and are circumferentially spaced apart from one another.

2. The earthing brush assembly according to claim 1, wherein the support of the earthing brush bears axially against the second front face of the main body of the mounting plate.

3. The earthing brush assembly according to claim 1, wherein the number of holding tongues is identical to the number of mounting segments, each tongue being arranged between two adjacent segments.

4. The earthing brush assembly according to claim 1, wherein the number of holding tongues is different to the number of mounting segments.

5. The earthing brush assembly according to claim 1, wherein each mounting segment comprises an outer axial bearing surface extending axially from the second front face of the main body, the outer axial bearing surface being radially spaced apart, by a non-zero radial distance, from the support of the earthing brush.

6. The earthing brush assembly according to claim 5, wherein each mounting segment comprises two connecting portions that connect the outer bearing surface to the outer surface of the main body.

7. The earthing brush assembly according to claim 1, wherein the earthing brush takes the form of an open or closed ring.

8. The earthing brush assembly according to claim 1, wherein the holding plate is created by stamping from a conductive material.

9. An electric machine comprising:
a housing,
a shaft, and
at least one earthing brush assembly including an earthing brush, and a brush mounting plate configured to radially and axially retain the brush, the brush comprising a support and a plurality of conductive individual fibers mounted in the support, the mounting plate comprising a radial main body that is axially delimited by a first front face and by a second front face, and a plurality of tongues for axially and radially retaining the brush, the tongues being circumferentially distributed around the main body of the mounting plate and extending axially from the second front face of the main body, and at least three mounting segments extending radially outwards from an outer surface of the main body, the mounting segments being distributed circumferentially around the main body of the mounting plate, each one of the segments locally surrounding the support of the earthing brush while remaining radially separated from the support, wherein
the earthing brush assembly is mounted radially between the housing and the shaft, and in radial contact with the shaft, wherein the mounting segments are regularly distributed about the main body and are circumferentially spaced apart from one another.

* * * * *